US010849376B2

(12) United States Patent
Evans

(10) Patent No.: US 10,849,376 B2
(45) Date of Patent: Dec. 1, 2020

(54) SLEEVE WITH ATTACHED AMBIDEXTROUS GLOVE

(71) Applicant: Kody Evans, Woodinville, WA (US)

(72) Inventor: Kody Evans, Woodinville, WA (US)

(*) Notice: Subject to any disclaimer, the term of this patent is extended or adjusted under 35 U.S.C. 154(b) by 76 days.

(21) Appl. No.: 16/416,126

(22) Filed: May 17, 2019

(65) Prior Publication Data

US 2019/0364995 A1    Dec. 5, 2019

Related U.S. Application Data

(60) Provisional application No. 62/679,713, filed on Jun. 1, 2018.

(51) Int. Cl.
*A41D 19/00* (2006.01)
*A41D 27/10* (2006.01)
*A41B 7/00* (2006.01)

(52) U.S. Cl.
CPC ............ *A41D 19/0041* (2013.01); *A41B 7/00* (2013.01); *A41D 19/0003* (2013.01); *A41D 27/10* (2013.01); *A41D 2300/22* (2013.01)

(58) Field of Classification Search
CPC ................ A41D 19/0041; A41D 27/10; A41D 19/0003; A41B 7/06; A41B 7/00
See application file for complete search history.

(56) References Cited

U.S. PATENT DOCUMENTS

| | | | | |
|---|---|---|---|---|
| 2,136,879 A | | 11/1938 | Haber et al. | |
| 2,274,510 A | * | 2/1942 | Wohl | A41D 19/0041 2/270 |
| 3,214,771 A | | 11/1965 | Treiber | |
| 4,856,112 A | * | 8/1989 | Effle | A41D 13/08 2/59 |
| 5,361,415 A | * | 11/1994 | Deering | A41D 19/01 2/158 |
| 6,092,235 A | * | 7/2000 | Santa Cruz | A41D 13/08 2/125 |
| 6,253,381 B1 | * | 7/2001 | Kelley | A41D 3/02 2/125 |

(Continued)

FOREIGN PATENT DOCUMENTS

CN            103099360 A      5/2013

OTHER PUBLICATIONS

Banggood.com. Long Sleeve Suede Bee Gloves Work Gloves Beekeeping Tool 52cm Length [date accessed Feb. 6, 2018]: https://www.banggood.com/Long-Sleeve-Suede-Bee-Gloves-Work-Gloves-Beekeeping-Tool-52cm-Length-p-1102227.html?p=96171935563852016015&cur_warehouse=CN.

*Primary Examiner* — Tajash D Patel
(74) *Attorney, Agent, or Firm* — Christopher Mayle; Thomas E. LaGrandeur; Bold IP, PLLC

(57) ABSTRACT

Embodiments are provided for a one-piece clothing garment that is made up of a sleeve comprising a holding band and a cuff, and an attached ambidextrous glove. Further, embodiments disclosed herein relate to a one-piece ambidextrous sleeve with an attached ambidextrous glove, where the sleeve is held onto a wearer's arm by a holding band at the top end of the sleeve, and the bottom end of the sleeve has a sleeve cuff with and a glove attached inside of the sleeve underneath the sleeve cuff at an attachment point. The glove is capable of being worn when the glove is in an un-tucked position. When the glove is not being worn by the wearer, the glove is capable of being tucked under or inside.

18 Claims, 4 Drawing Sheets

(56) References Cited

U.S. PATENT DOCUMENTS

| | | |
|---|---|---|
| 7,062,792 B2 | 6/2006 | Jaunault et al. |
| 2007/0204373 A1* | 9/2007 | Loyens ................ A41D 31/245 2/16 |
| 2009/0100561 A1* | 4/2009 | Holmes .............. A41D 19/0044 2/16 |
| 2017/0188643 A1* | 7/2017 | Peifer ................ A41D 19/0157 |

* cited by examiner

SLEEVE WITH ATTACHED AMBIDEXTROUS GLOVE

CROSS-REFERENCE TO RELATED APPLICATIONS

This application claims priority to U.S. Provisional Application No. 62/679,713 filed Jun. 1, 2018, which is incorporated by reference in its entirety.

FIELD OF THE DISCLOSURE

This disclosure relates generally to a novel single-piece clothing garment having an ambidextrous glove attached to said garment sleeve, wherein said glove can be tucked within said sleeve when not in use and wherein the glove when not tucked remains secured to the sleeve so that it cannot be lost.

BACKGROUND

In the past, attempts to conceal and secure gloves to clothing garments, such as jackets and coats, have resulted in ill-fitting and bulky designs that were not suitable for all body types. Additionally, in many of these clothing garments, the gloves remained visible and presented an untidy appearance with loose ends when in the tucked position and were not readily available or properly secured.

Additionally, the available gloved clothing garments of the past are not suitable, for example, for the clothing garment needs of someone who needed to wear a Santa Clause outfit or other costume apparel as they lack necessary costume design features. Further, these gloved clothing garments are usually attached to entire coats or jackets at a fixed point and are not wearable on either hand or arm of the wearer. There have been some examples to address these concerns. For example, U.S. Pat. No. 3,214,771 is directed to a garment sleeve having a pocket located near the wrist portion of the sleeve, whereby the pocket can fit an attached glove. Although this patent shows the use of a garment sleeve that has an attached glove like member with the glove being capable of being tucked into the sleeve's pocket, it does not show the use of an ambidextrous glove, having the sleeve garment be a standalone one-piece clothing garment having an elastic band to hold it onto the wearer's arm, or the ability to tuck the glove into the sleeve of the clothing garment without the use of a pocket.

SUMMARY

The disclosure presented herein relates to exemplary embodiments for a one-piece clothing garment that is made up of a sleeve comprising a holding band a cuff, and an attached ambidextrous glove. Further, embodiments disclosed herein relate to a one-piece ambidextrous sleeve with an attached ambidextrous glove, whereby the sleeve is held onto the wearer's arm by a holding band at the top end of the sleeve and the bottom end of the sleeve is a cuff with a glove attached inside of the sleeve underneath the sleeve cuff at an attachment point. The glove is capable of being worn when the glove is in an un-tucked position. When the glove is not being worn by the wearer, the glove is capable of being tucked under or inside. Those of ordinary skill will appreciate that other uses may be foreseeable also and are included within the scope of the present description.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

DETAILED DESCRIPTION

Figure 1:
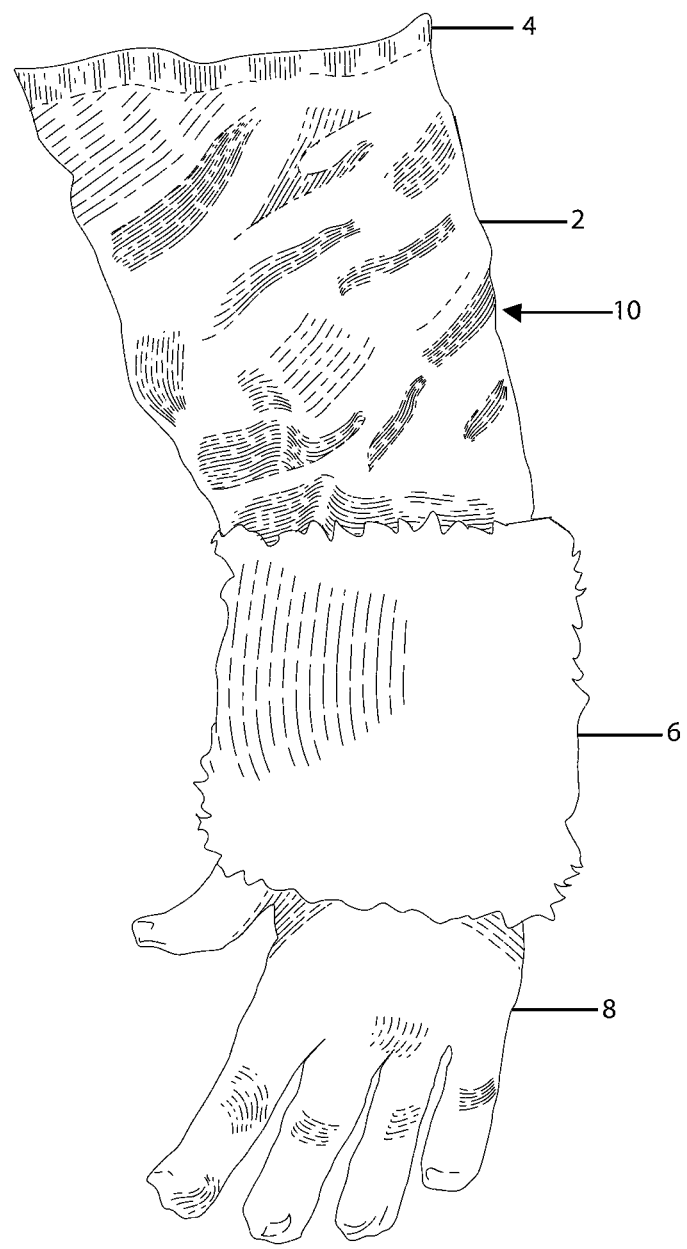
FIG. 1 is a perspective view of a one-piece clothing garment according to various aspects of the present disclosure.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Embodiments for a one-piece clothing garment of the present disclosure may be used by a wearer as a one-piece sleeve that is held onto the wearer's arm by an elastic band located at the top of the sleeve. Attached to the sleeve is an ambidextrous glove, which combined with the sleeve may form an entire ambidextrous (e.g. useful for either hand and/or either arm of a wearer) one-piece clothing garment. Such an exemplary clothing garment may have many benefits. One of the many benefits is that such a clothing garment may be a great asset for those who need to add sleeves to their costumes, such as for example, the hundreds of thousands of people who dress up as Santa Clause each year or for Halloween or any other special occasion or holiday. Additional non-limited uses of the one-piece clothing garment include wearing it as a novelty item at a party, or as a clothing item to keep a wearer's arms and hands warm. Additionally, a unique element of one or more embodiments of a clothing item described in the present description is that the wearer may remove the glove while wearing the one-piece clothing garment and tuck the glove into the sleeve, underneath a sleeve cuff located at the bottom end of the one-piece garment, so as to allow a wearer to use their bare hands and not risk losing the attached glove. The elements or components described herein are meant to be non-limiting and illustrative, rather than restrictive. Those of ordinary skill in the art will appreciate that other various and embodiments may still be within the spirit and scope of the present disclosure.

FIG. 1 shows a perspective view of an exemplary embodiment of a one-piece clothing garment shown as one-piece clothing garment 10. In this embodiment, one-piece clothing garment 10 may include an ambidextrous sleeve 2 and an attached ambidextrous glove 8. Ambidextrous sleeve 2 has a first end or a top end where a holding band 4 is sewn in, and a second end or a bottom end where a sleeve cuff 6 is located.

Ambidextrous sleeve 2, as shown in FIG. 1, is an elongated tubular shaped piece of fabric that is defined with holding band 4 at the top end and sleeve cuff 6 located at the bottom end. A length of ambidextrous sleeve 2 may be measured from the top end to the bottom end, that generally is measured from the wrist of a wearer to the wearer's upper arm in some embodiments. In some embodiments, ambidextrous sleeve 2 is made of a fabric material including spandex or elastic yarn, fabrics that gather, knitted materials or any other type of suitable material. In a further embodiment, ambidextrous sleeve 2 is made out of multiple layers of fabric. In one non-limiting embodiment, ambidextrous sleeve 2 is red in color and may have the appearance of a sleeve that would be worn with a Santa Clause suit. Those of ordinary skill in the art will appreciate that a plethora of designs, colors, and/or patterns or accessories may be used in alternative embodiments.

As shown in FIG. 1, ambidextrous sleeve 2 has a circumference measured at a terminating end at the top and bottom of said sleeve. For example, the circumference at the top end, where the sleeve would be worn around a wearer's upper arm, may be measured and have a first size. Additionally, at the bottom end of the sleeve, underneath sleeve cuff 6 and where a wearer's wrist would be located, the bottom portion may have a circumference measured as a second size. In one embodiment, the circumference of the first size is larger than the circumference of the second size. This first and second size can be selected depending on the size of the wearer's arm.

In one embodiment, holding band 4 is used to hold one-piece clothing garment 10 onto the wearer's arm. In one non-limiting embodiment, holding band 4 is made of elastic material and is sewn into the top circumference of ambidextrous sleeve 2 and is located around 4 inches from the top of the wearer's shoulder when one-piece clothing garment 10 is worn. In one embodiment, holding band 4 is made of an elastic material that has elastically expansive properties. Any type of elastic material known in the art may be used. Further, in some embodiments, holding band 4 may be made of any type of non-elastic material or fabric known in the art. Thus, in some embodiments, holding band 4 is composed of varying materials with at least the top end of ambidextrous sleeve 2 having an elastic material having one or more properties characteristic of elastic material, including the ability to expand from and retract back to an original size.

Sleeve cuff 6 may be located at the bottom end of ambidextrous sleeve 2. In one embodiment, the sleeve cuff is sewn around the bottom end of ambidextrous sleeve 2. In another embodiment, sleeve cuff 6 is sewn at the bottom of ambidextrous sleeve 2 and extends the length of the garment past the length of ambidextrous sleeve 2. In one non-limiting embodiment, the end of ambidextrous sleeve 2 may be extended by the width of sleeve cuff 6, whereby the width of sleeve cuff 6 may be around 2-5 inches.

In one embodiment, underneath sleeve cuff 6 at the bottom end of the sleeve, is a second holding band. In this embodiment, the holding band serves a similar purpose as the holding band 4 located at the top end of the one-piece clothing garment 10, except the bottom end holding band is used to hold the bottom end of the sleeve against a wearer's wrist. In this embodiment, sleeve cuff 6 is used to hide the holding band from the external appearance of one-piece clothing garment 10, as the holding band is located underneath the sleeve cuff.

One-piece clothing garment 10, as shown in FIG. 1, also includes an attached ambidextrous glove, shown as ambidextrous glove 8. Ambidextrous glove 8, in one embodiment, is attached to the sleeve to form the one-piece clothing garment 10. In one embodiment, the glove is a fabric material including spandex or elastic yarn, cotton, fabrics that gather, knitted materials or the like, including the type used to make common gloves. Further, in the embodiment shown in FIG. 1, ambidextrous glove 8 can be worn on a wearer's right or left hand. Ambidextrous glove 8 attached with ambidextrous sleeve 2, forms an ambidextrous one-piece clothing garment.

Figure 2:
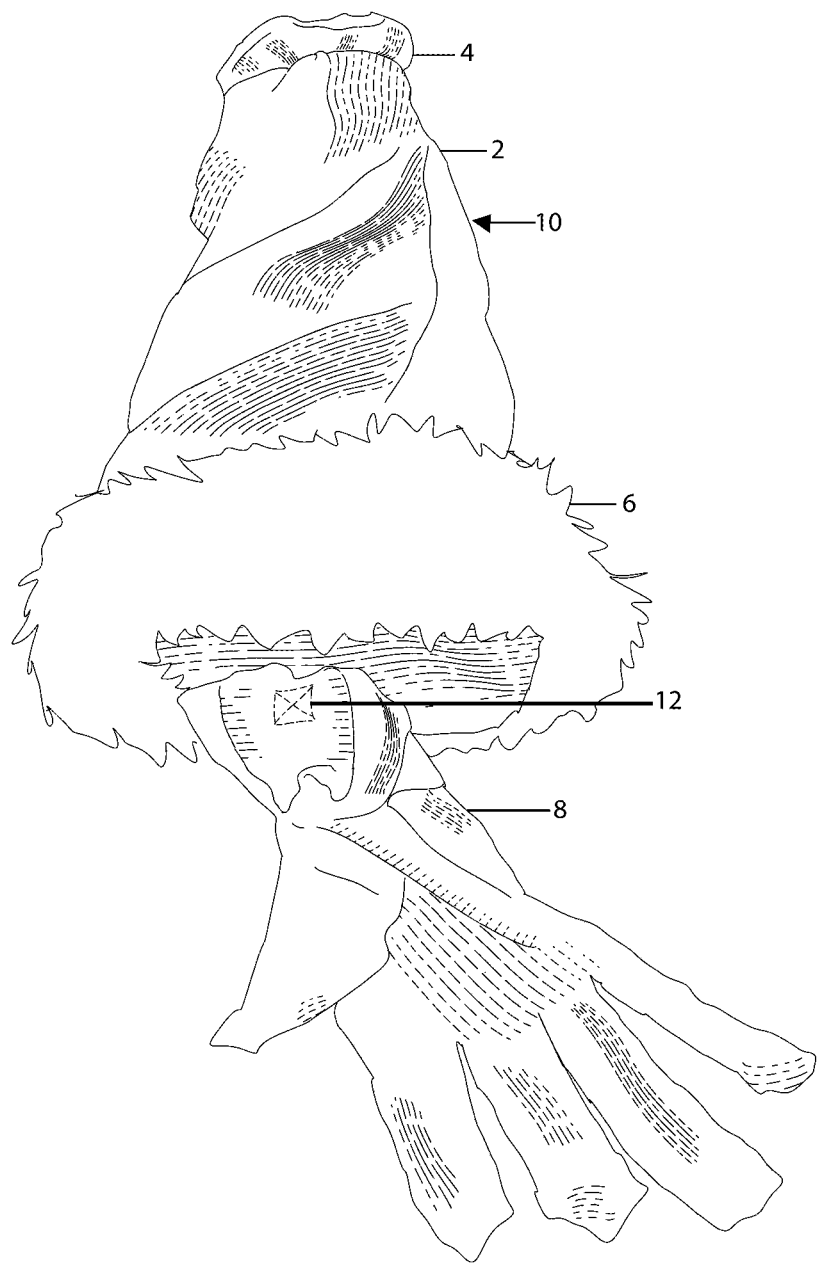
FIG. 2 is an isometric view of the FIG. 1 clothing garment according to various aspects of the present disclosure.

FIG. 2 shows an isometric view of the one-piece clothing garment 10 of FIG. 1. In this view, ambidextrous sleeve 2, holding band 4, ambidextrous glove 8, and attachment point 12 are shown. The FIG. 2 view shows ambidextrous glove 8 attached to ambidextrous sleeve 2 (underneath sleeve cuff 6) at attachment point 12. In this view, ambidextrous glove 8 is not sewn around the circumference of the wrist of ambidextrous glove 8 to the circumference of the wrist of the sleeve, but rather ambidextrous glove 8 and ambidextrous sleeve 2 are sewn together at attachment point 12. In this view, attachment point 12 is located at the interior of the bottom end of ambidextrous sleeve 2 that is located underneath sleeve cuff 6. This embodiment allows sleeve cuff 6 to hide the stitching of the attachment seams of the ambidextrous glove. In one embodiment, the ambidextrous glove can be sewn, glued, fastened using any type of fastener, or any other attachment means to ambidextrous sleeve 2 may alternatively be used.

Additionally, by attaching ambidextrous glove 8 to the bottom end of ambidextrous sleeve 2, the wearer can wear one-piece clothing garment 10 with ambidextrous glove 8 or remove the ambidextrous glove 8 and tuck it inside of ambidextrous sleeve 2 underneath sleeve cuff 6. This allows the wearer to remove ambidextrous glove 8 for when, for example, it is too warm to wear the glove. Having the ability to remove ambidextrous glove 8 and tuck inside of ambidextrous sleeve 2 advantageously may also prevent the wearer from losing the glove and to quickly access when needed to be worn.

Figure 3:
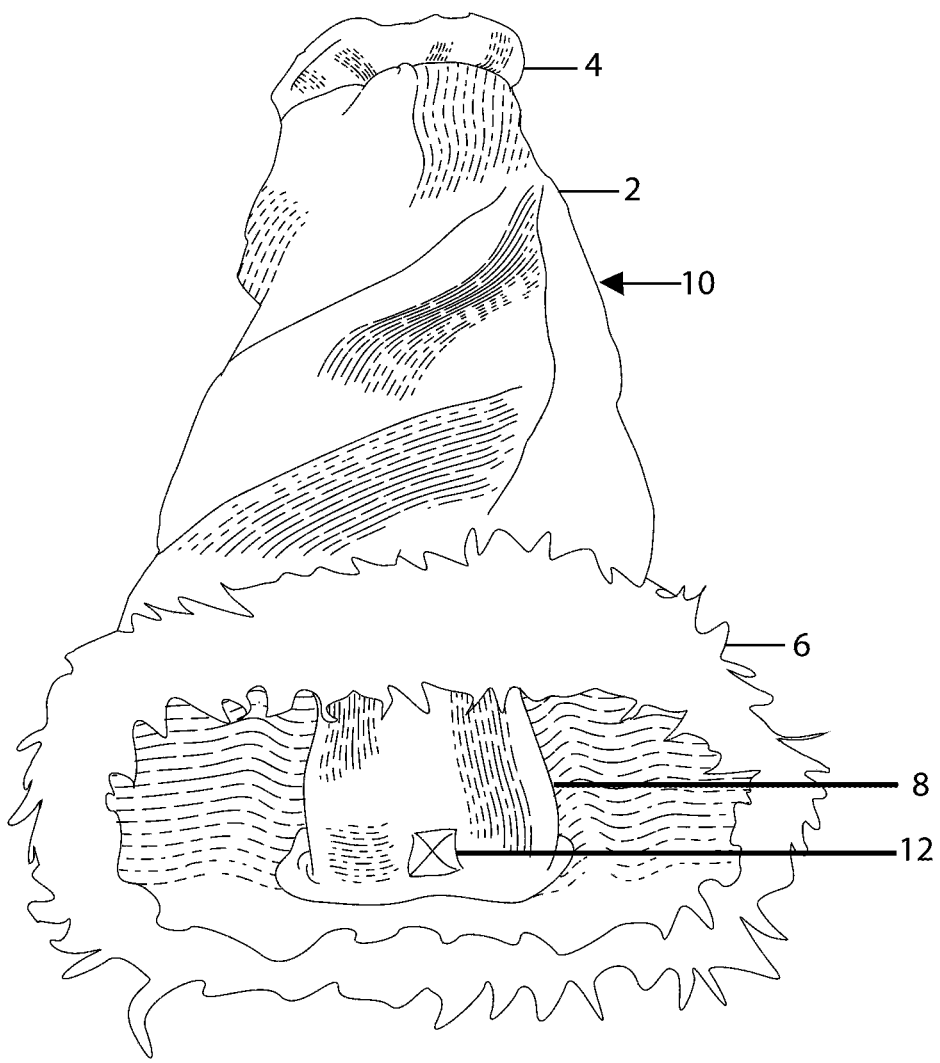
FIG. 3 is an isometric view of the FIG. 1 clothing garment wherein the glove is tucked inside of the cuff sleeve according to various aspects of the present disclosure.

FIG. 3 shows an isometric view of one-piece clothing garment 10 of FIG. 1 with ambidextrous glove 8 tucked inside of the garment. This embodiment shows how ambidextrous glove 8 is attached to sleeve 8 by sewing the exterior of ambidextrous glove 8 to the interior of ambidextrous sleeve 2, underneath sleeve cuff 6. In another embodiment, the ambidextrous glove is sewn from the inside of the glove to ambidextrous sleeve 2. In a further embodiment, the ambidextrous glove is sewn to sleeve cuff 6.

Figure 4:
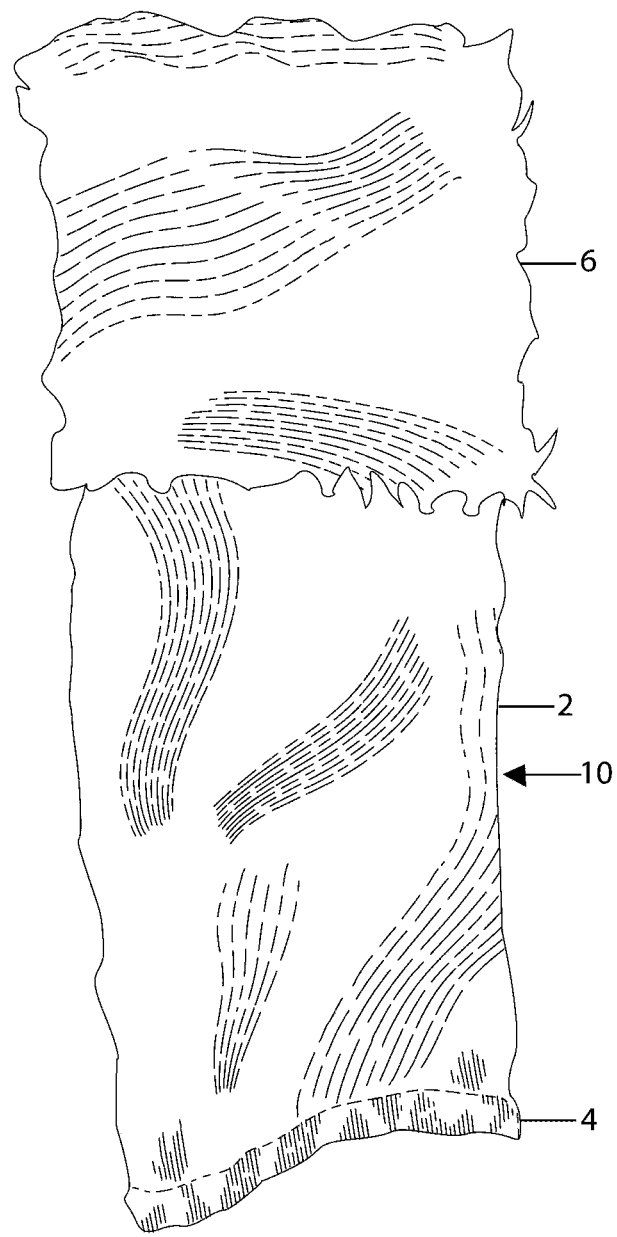
FIG. 4 is a top view of the FIG. 1 clothing garment wherein the glove is tucked inside of the cuff sleeve according to various aspects of the present disclosure.

FIG. 4 is a top view of one-piece clothing garment 10 according to various aspects of the current disclosure. In this embodiment, one-piece clothing garment 10 shows ambidextrous sleeve 2, holding band 4, and sleeve cuff 6. In this embodiment, one-piece clothing garment 10 appears as it would appear from a top down view of the wearer of said garment with their arms stretched in the direction of sleeve cuff 6. Sleeve cuff 6 would be around the wearer's wrist, sleeve 6 around the wearer's arm, and holding band 4 around the wearer's upper arm. In this embodiment, the ambidextrous glove (numbered 8 in previous figures) is tucked inside of sleeve cuff 6, and in some embodiments, ambidextrous sleeve 2. In the tucked position, the ambidextrous glove is not visible from the exterior of one-piece clothing garment 10.

While preferred and alternate embodiments have been illustrated and described, as noted above, many changes can be made without departing from the spirit and scope of the SLEEVE WITH ATTACHED AMBIDEXTROUS GLOVE. Accordingly, the scope of the SLEEVE WITH ATTACHED AMBIDEXTROUS GLOVE is not limited by the disclosure of these preferred and alternate embodiments. Instead, the scope of the SLEEVE WITH ATTACHED AMBIDEXTROUS GLOVE is determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

I claim:

1. A one-piece clothing garment comprising:
    a sleeve, the sleeve comprising a first end and a second end, wherein said first end comprises a circular holding band, and
    a glove, wherein said glove is attached to an inside circumference of the second end of the sleeve, wherein the sleeve is elongated and tubular in shape, the second end further comprising a sleeve cuff around an outside circumference of said second end of said sleeve.

2. The one-piece clothing garment of claim 1, wherein said sleeve and said glove are configured to be worn by a left arm and hand or right arm and hand of a user depending on the orientation of the sleeve and the glove.

3. The one-piece clothing garment of claim 1, wherein said circular holding band is made of an elastic material and sewn into said sleeve.

4. The one-piece clothing garment of claim 1, wherein the first end of the sleeve has a circumference of a first size and the second end of the sleeve has a circumference of a second size, wherein the first size is larger than the second size.

5. The one-piece clothing garment of claim 1, wherein the sleeve cuff has a length between two and five inches.

6. The one-piece clothing garment of claim 1, further comprising a holding band on the second end of said sleeve.

7. The one-piece clothing garment of claim 6, wherein said holding band is sewn into the interior of the sleeve.

8. The one-piece clothing garment of claim 1, wherein said glove is attached to the inside circumference of the second end of said sleeve at an attachment point.

9. The one-piece clothing garment of claim 1, the sleeve cuff sewn at the second end of the sleeve extending the length of the garment past the length of the sleeve.

10. The one-piece clothing garment of claim 1, wherein said sleeve cuff is made of a fluffy material and has a circumference greater than the circumference of the sleeve.

11. The one-piece clothing garment of claim 1, wherein said sleeve is made of a red colored fabric or velvet material.

12. The one-piece clothing garment of claim 1, wherein a portion of an exterior wrist of the glove is directly sewn to the interior circumference of the second end of said sleeve.

13. A one-piece clothing garment comprising:
    an ambidextrous sleeve having an elongated tubular shape further comprising:
    a circular holding band located at a first end of said ambidextrous sleeve, said circular holding band configured to hold said ambidextrous sleeve on a wearer's arm;
    a sleeve cuff having a circumference larger than a the circumference of said ambidextrous sleeve located at a second end of said ambidextrous sleeve; and
    an ambidextrous glove.

14. The one-piece clothing garment of claim 13, the ambidextrous glove sewn to said ambidextrous sleeve by a stitching made on an interior wrist portion of said glove to an interior circumference of said ambidextrous sleeve, the ambidextrous glove configured to be tucked inside the ambidextrous sleeve.

15. The one-piece clothing garment of claim 14, wherein said circular holding band is made of an elastic material.

16. The one-piece clothing garment of claim 13, wherein the ambidextrous glove is sewn to the sleeve cuff.

17. The one-piece clothing garment of claim 16, wherein said circular holding band is made of an elastic material.

18. The one-piece clothing garment of claim 17, wherein the first end of the ambidextrous sleeve has a circumference of a first size and the second end of the ambidextrous sleeve has a circumference of a second size, wherein the first size is larger than the second size.

* * * * *